United States Patent [19]

Berger et al.

[11] Patent Number: 5,180,646

[45] Date of Patent: Jan. 19, 1993

[54] NICKEL-CADMIUM STORAGE BATTERY WITH IMPROVED ELECTRICAL PROPERTIES

[75] Inventors: Gerhard Berger, Natternweg; Gabor Benczûr-Ürmössy, Stuttgart; Klaus von Benda, Nürtingen, all of Fed. Rep. of Germany

[73] Assignee: Deutsche Automobilgesellschaft mbH, Fed. Rep. of Germany

[21] Appl. No.: 700,398

[22] Filed: May 15, 1991

[30] Foreign Application Priority Data

May 15, 1990 [DE]  Fed. Rep. of Germany ....... 4015495

[51] Int. Cl.⁵ ............................................ H01M 4/62
[52] U.S. Cl. .................................. 429/198; 429/215; 429/222
[58] Field of Search ................ 429/198, 215, 222, 217

[56] References Cited

U.S. PATENT DOCUMENTS

| | | | |
|---|---|---|---|
| 2,870,234 | 1/1959 | Moulton | 429/215 |
| 4,071,662 | 1/1978 | Mess et al. | 429/215 X |
| 4,232,100 | 11/1980 | Magnusson et al. | 429/217 |
| 4,405,700 | 9/1983 | Rampel | 429/248 |
| 4,990,414 | 2/1991 | Matsui et al. | 429/222 X |

*Primary Examiner*—Stephen Kalafut
*Attorney, Agent, or Firm*—Evenson, Wands, Edwards, Lenahan, & McKeown

[57] ABSTRACT

A nickel-cadmium storage battery with improved electrical properties is described in which one or more copolymers of vinyl pyrrolidone is/are added as expander to the active material with which the negative electrode is filled or to the electrolyte. The polymers have a mean molecular weight of 10,000 g/mol to 100,000 g/mol, with a vinyl pyrrolidone content of between 5 and 95 mol-%. The copolymers are added to the active material or to the electrolyte in an amount of 0.1 to 1.0% by weight, based on the active material. As a result of adding the copolymers, a malfunction-free operation of the storage battery is achieved, accompanied by a simultaneously equally as good degree of utilization of the cadmium active material compared with a storage battery which contains homopolymeric polyvinyl pyrrolidone.

15 Claims, No Drawings

NICKEL-CADIUM STORAGE BATTERY WITH IMPROVED ELECTRICAL PROPERTIES

BACKGROUND AND SUMMARY OF THE INVENTION

The invention relates to a nickel-cadmium storage battery with improved electrical properties, in which the active material with which the negative electrode is filled or the electrolyte contains copolymers of vinyl pyrrolidone as expanders.

The technical cadmium electrodes of alkaline systems such as, for example, in Ni/Cd storage batteries, can be operated only by the use of expanders—also termed extenders. Without the addition of expanders, the capacity of cadmium electrodes decreases rapidly, particularly at high current densities. A coarsening of the crystals of the solid reactants, and consequently a decrease in the specific surface of cadmium or cadmium hydroxide, occurs. The expanders improve the utilization of cadmium electrodes. In this connection, cadmium utilization is understood as meaning the ratio of utilizable capacity to the theoretical capacity. The latter is determined from the amount of active material such as, for example, Cd, CdO and/or $Cd(OH)_2$ introduced into the electrode, using the second Faraday law. The cell capacity of Ni/Cd storage batteries is determined almost exclusively by the nickel oxide electrode—the positive electrode. The utilizable capacity of the cadmium electrode—the negative electrode—is overdimensioned since its capacity depends more strongly on the discharge current density than that of the positive electrode. In the absence of expansion or with deficient expansion of the reactants on the negative electrode, the cell capacity is determined by the latter and is consequently strongly load-dependent.

Both inorganic and organic substances are already known as expanders. Of the inorganic substances, iron or iron oxide ($Fe_2O_3$) has already been used for a long time and frequently, particularly in pocket-type plate electrodes. A disadvantage in the case of iron is its solubility in alkali (ferrate VI formation). An iron poisoning of the positive electrode occurs; this results in a drop in capacity. In addition, the proportion normally used of about 10 to 40% by weight of iron decreases the capacity of the cadmium electrode per unit weight.

Nickel and nickel hydroxide are furthermore known as standard additives. The nickel is deposited along with the cadmium active material by a simultaneous electrolysis. The nickel hydroxide is produced in sintered electrodes or sintered foil electrodes by corrosion of the nickel framework. It can be introduced by impregnation with a nickel salt solution and subsequent precipitation with alkali (East German Patent Specification 12,053) by adding nickel hydroxide powder to the active material (U.S. Pat. Specification 3,870,562 and German Offenlegungsschrift 2,445,096) or in the form of a suspension (V.A. Reshetov et al., J. Appl. Chem. USSR, 52 (1979), pages 548 ff.). In addition, some gastight Ni/Cd storage batteries contain nickel hydroxide in the negative electrode as an antipolar material. A disadvantage in the case of nickel and its compound is that it forms with cadmium the intermetallic phase $Ni_5Cd_{21}$, which can be discharged only about 150 mV more anodically than cadmium and is consequently removed from the discharge reaction of the cadmium electrode in the normal potential range. Since 4.2 cadmium atoms are bound per nickel atom, a greater addition of nickel and/or nickel compounds is ruled out.

Further inorganic expanders are cited in the literature, but virtually nothing is known about their use. Thus, the East German Patent Specification 12,053 describes the addition of 1% by weight of MgO or $Mg(OH)_2$ to the cadmium active material, which is additionally also activated with nickel sulphate. British Patent Specification 792,464 mentions, in addition to known substances, the addition of copper, copper oxide, cobalt, cobalt oxide, mercury and/or mercury oxide. A. Fleischer, "Proc. 11th Ann. Battery Research and Development Conference" (1957), pages 83 ff., reports on the positive effect of indium on the capacity of the cadmium electrode. O.C. Wagner "J. Electrochem. Soc.", 116 (1969), pages 693 ff., reports on the use of 5 to 10% by weight of $TiO_2$ instead of $Fe_2O_3$ in cadmium electrodes.

Recently organic expanders have frequently been preferred since they usually only have to be added in small amounts of up to about 1% by weight, based on the cadmium active material. In this connection, the polyvinyl alcohol frequently mentioned or used has more binder than expander properties. According to U.S. Pat. Specification 2,802,043, alkali-soluble cellulose derivatives—particularly carboxymethylcellulose (CMC)—are suitable as expanders. Associated with the electrolyte solubility is, however, a susceptibility to oxidation. With increasing operating time, the CMC disappears and instead of it, the oxidation product, carbonate, accumulates in the electrolyte and this is known to have an adverse effect on the capacity of the cadmium electrode.

According to U.S. Pat. Specification 4,471,038, the addition of polybenzimidazole and polybenzothiazole and polybenzoxazole to the electrolyte or to the cadmium electrode of Ni/Cd storage batteries is beneficial for increasing the capacity or the utilization of the cadmium electrode. S. Sathyanarayana, "J. Appl. Electrochem.", 15 (1985), pages 453 ff., reports on an unusually high cadmium utilization of 96±2% if ethylcellulose is added to nickel sintered electrodes. According to in-house investigations, ethylcellulose has no expanding action. Pyrazolone derivatives were investigated as expanding additives by MG. Mikhalenko et al., "J. Appl. Chem. USSR" 49 (1976), pages 2022 ff. A disadvantage cited is that, in the initial cycles, the cathodic reduction of cadmium oxide occurs partly only in the overcharge phase during the evolution of hydrogen. In this connection, the electrodes are compared with those which contain "solar oil" as expanding additive.

P.V. Vasudeva Rao et al., "J. Power Sources", 1 (1976), pages 81ff., report on increased cadmium utilization on adding tetraalkylammonium compounds, particularly in the case of discharge rates of between 1° C. and 10° C. According to U.S. Pat. Specification 2,870,234 or German Patent Specification 1,063,665, polyvinylpyrrolidone (PVP) is suitable as an expander in cadmium electrodes. An addition of about 1% by weight, based on the cadmium active material, is proposed. Since PVP is water-soluble, it can be precipitated from aqueous solutions by strong alkali. It was therefore advantageous to use PVP for expanding fibrous-structure electrodes which are filled, according to German Offenlegungsschrift 3,817,827, with aqueous cadmium oxide paste.

It is only by the invention that the expanding effect of PVP depends on the mean PVP molecular weight (German Application P 40 15 494.7, filed May 15, 1990, corresponding U.S. Application Ser. No. 07/691,732, filed Apr. 26, 1991) that the use of PVP as expander in cadmium electrodes has become possible at all. The cadmium electrodes can be charged without difficulty and have a good cadmium utilization from the outset.

Nevertheless, it does occur that PVP-expanded electrodes exhibit a potential deviating considerably from the $Cd/Cd(OH)_2$ equilibrium potential in the cathodic direction during the first charging; in addition to the cathodic reduction of cadmium oxide or cadmium hydroxide a parasitic evolution of hydrogen occurs. The reduction of the cadmium hydroxide is consequently incomplete after a standard charging. It requires several chargings and dischargings before it is complete. Accordingly, the load-carrying capacity of the cadmium electrode is poor in the initial cycles. Malfunctions such as, for example, potential steps and/or variations are usually manifested even during the second and subsequent chargings, and this is undesirable in the operation of an Ni/Cd storage battery. In the case of the gastight Ni/Cd storage battery, the pressure which builds up may deform the cell housing or even cause it to burst.

The malfunctions of the type described occur if
the first charging is interrupted by a power failure, it is predominantly hydrogen evolution which occurs at the cadmium electrode after elimination of the power failure;
water-moist or incompletely dried cadmium electrodes are used in assembling a Ni/Cd storage battery;
a prolonged time, for example 12 hours, elapses before the start of the first charging after pouring in the cell electrolyte.

The object of the invention is therefore to provide a nickel-cadmium storage battery with improved electrical properties, in which a copolymer of vinyl pyrrolidone is added to the active material of the electrode or to the electrolyte, so that the malfunctions cited above can no longer occur and the utilization of the cadmium electrode is at least as good as when unmodified (homopolymeric) polyvinyl pyrrolidone is added.

This object is achieved, according to the invention, by providing a nickel-cadmium storage battery with improved electrical properties, in which the active material with which the negative electrode is filled or the electrolyte contains polymeric vinyl pyrrolidone as expander, one or more copolymers of vinyl pyrrolidone being added to the active material or to the electrolyte, wherein the added copolymers of vinyl pyrrolidone have a mean molecular weight of 10,000 g/mol to 100,000 g/mol and the added copolymers have a vinyl pyrrolidone content of between 5 and 95 mol-%. Especially preferred embodiments include expedient refinements of the vinyl pyrrolidone copolymer which is added to the active material or to the electrolyte.

Copolymers of vinyl pyrrolidone—hereinafter also termed vinyl pyrrolidone-containing polymers—are understood as meaning those polymers which contain at least one other monomer in addition to vinyl pyrrolidone.

Copolymers of vinyl pyrrolidone (VP) and vinyl acetate (VAc) in various compositions, for example Luviskol VA and Collidon VA polymers (BASF): Luviskol VA 73, Luviskol VA 64, Luviskol VA 55, Luviskol VA 37 and Luviskol VA 28, have proved particularly satisfactory. The first digit always indicates the proportion of VP and the second the proportion of VAc. The delivery form of these substances is usually an ethanolic or isopropanolic solution characterized by the appended index E or I; Luviskol VA 64 also exists as a powder. The mean molecular weight decreases with increasing vinyl acetate content. In the case of Luviskol VA 73 E, the weight average of the molecular weight is about 80,000 g/mol and of Luviskol VA 28 I about 15,000 g/mol. With an increase in the proportion of VAc, the water solubility of these polymers decreases. Preferred are those which are clearly water-soluble; this is no longer the case starting with Luviskol VA 37. Nevertheless, these are still usable.

Furthermore, copolymers of vinyl pyrrolidone, vinyl acetate and alkyl aminoacrylate are also suitable. These polymers are commercially obtainable under the designation Luviflex D 430 I (30% by weight of VP) and Luviflex D 455 I (55% by weight of VP; manufacturer BASF). The weight average of the molecular weight is about 40,000 to 50,000 g/mol. of the two, the last-named polymer is particularly suitable.

Also suitable is the copolymer Gafquat 734 (GAF), which consists of 73.4% by weight (=85.2 mol-%) of vinyl pyrrolidone, 7.5% by weight (=6.1 mol-%) of dimethylaminoethyl methacrylate and 19.1% by weight (=8.7 mol-%) of trimethylammoniumethyl methacrylate monoethyl sulphate, which can also be described as a partially quaternized copolymer of VP and dimethylaminoethyl methacrylate. The weight average of the molecular weight is about 100,000 g/mol. Gafquat 755 N, which has a mean molecular weight of about $10^6$ g/mol., exhibits no action.

The expanding action of copolymers of VP is at the same time not limited to these substances, as investigations with copolymers of VP and dimethylaminoethyl methacrylate and VP and acrylic acid have shown.

Malfunctions as described above for polyvinyl pyrrolidone no longer occur if the vinyl pyrrolidone-containing polymers ar used. This applies both to the addition of the copolymers to the active material of the electrode and also if the copolymers are added to the electrolyte. However, just as for PVP, there is a critical expander/cadmium molar ratio for these polymers for which an overexpansion occurs if it is exceeded. This is manifested in a strong disturbance of the charge acceptance, such as potential steps and/or premature changeover to hydrogen evolution, associated with a poor cadmium utilization. Owing to the diversity of the polymers used according to the invention—which relates to composition and mean molecular weight—it is not possible to cite a uniform critical molar ratio. In addition, it depends on the electrolyte concentration; it increases with increasing electrolyte concentration The introduction of the expanders according to the invention into the cadmium electrode depends on its production. The expander can be added during the production of an active material paste, or it can be introduced by impregnating a dried electrode, or it can be added as an aqueous or aqueous/alcoholic solution to the electrolyte, the copolymers being precipitated by the alkali.

The polymers according to the invention may also be introduced into the separator or into other bodies contained in the electrolyte (with the exception of the nickel oxide electrode). Despite their low electrolyte solubility, they migrate to the cadmium electrode, where they exert their expanding action (see Example 5).

In the production of a cadmium oxide paste in accordance with the teaching of German Offenlegungsschrift 3,817,827, the particular expander is added to the dispersant solution and dissolved therein. Usually the substances cited take the form of an ethanolic or isopropanolic solution, in which case removal of the solvent is unnecessary. The polymer can only be added to the polyphosphate—or diphosphonate—containing dispersant solution if it carries no charge or a negative charge. If, as in the case of Gafquat 734, the polymer chain is positively charged, it has to be added to the cadmium oxide paste produced. During homogenization, an increase in the viscosity of the paste occurs since the CdO particles, which are negatively charged as a consequence of dispersant adsorption, are bridged by the positively charged polymer chain. This and the additional working step are a disadvantage if Gafquat 734 is used. Luviskol VA 73 E, which can be obtained as an ethanolic solution containing 50% by weight solids, has proved the most satisfactory. It contains 70% weight (=64.4 mol-%) of vinyl pyrrolidone and 30% by weight (=35.6 mol-%) of vinyl acetate.

The action of the polymers according to the invention is surprisingly intensified in the presence of the metal oxides and/or hydroxides mentioned in the introduction. The combination is far more effective than the individual additives alone, i.e., there is a synergistic effect. It is found that the combined addition keeps the capacity of the cadmium electrode at a high level over hundreds of cycles (Example 4). This applies to a wide range of current densities which corresponds to complete discharges of a few hours to a few minutes.

The expanding action of vinyl pyrrolidone-containing polymers stabilizes the capacity of the cadmium electrode at a lower level. The action of the inorganic oxides and hydroxides, including $Ni(OH)_2$, decreases markedly with the cycle duration if they are used alone without organic expander. A cadmium electrode is not usable without additive.

The most effective way of introducing nickel hydroxide is by impregnation with a nickel sulphate solution and subsequent precipitation when the electrolyte is added. The oxides and hydroxides of nickel, magnesium and titanium, and also the nickel salt of 1-hydroxyethane-1,1-diphosphonic acid can be incorporated in the cadmium oxide paste.

To test the expanding action, cadmium electrodes were operated in a half-cell arrangement with an excess of electrolyte and inert nickel plates as counter-electrodes. 4 M KOH+0.4 M LiOH, and also 6 M KOH +0.4 M LiOH were usually used as electrolyte and the Hg/HgO electrode served as reference electrode in the same electrolyte. The electrodes usually had a size of 7 cm×7 cm =49 $cm^2$. The thickness varied between 0.8 mm and 3.5 cm, electrodes having a thickness of 2.5 m being investigated most frequently. The expansion effectiveness was assessed by determining the cadmium utilization at various discharge current densities; these were usually between 12 $mA/cm^2$ and 600 $mA/cm^2$. An initial selection of the substances tested for expanding effect can be determined even after a few cycles, particularly in the case of discharge with current densities of 200 $mA/cm^2$ and above. The cadmium electrodes containing promising expanders were tested in a continuous test over a few hundred cycles. In these cases, the electrodes were operated at low current densities. After 100 cycles in each case, the determination of the cadmium utilization was repeated at a high discharge current density.

EXAMPLE 1

A nickel fibrous structure provided with a current collector and having a size of 7 cm ×7 cm and a thickness of 2.4 mm was impregnated with a cadmium oxide paste. The paste contained, in addition to the dispersant polyphosphate, the expander Luviskol VA 73 E (BASF), the latter having a content of 0.47% by weight, based on the cadmium oxide. The dried electrode contained 22.26 g of cadmium oxide, which corresponds to a theoretical capacity of a 9.28 Ah. The cadmium electrode was tested in the standard half-cell arrangement with nickel sheets as counterelectrodes and an Hg/HgO reference electrode. 4 M KOH +0.4 M LiOH served as electrolyte. In the initial cycles, the current density was 12 $mA/cm^2$ during charging and discharging. The first charging took place at a potential of about $-1000$ mV against Hg/HgO, the subsequent ones at a potential of about $-940$ mV (Hg/HgO). In the subsequent cycle a high-current discharge took place at a final discharge potential of $-400$ $mA/cm^2$ to $-500$ mV (Hg/HgO). Under these circumstances, the electrode yielded a capacity of 3.18 Ah, which corresponds to a cadmium utilization of 34.3%. A comparison electrode which had a theoretical capacity of 8.42 Ah and contained 0.32% by weight of polyvinyl pyrrolidone (Kollidon 17, BASF), based on cadmium oxide, yielded 2.78 Ah under the same conditions. This corresponds to a cadmium utilization of 33.0% of theory.

EXAMPLE 2

A cadmium electrode having a size of 7 cm ×7 cm and a thickness of 2.3 mm contained 19.98 g of cadmium oxide, which corresponds to a theoretical capacity of 8.33 Ah. The content of Gafquat 734 (GAF) was 0.47% by weight, based on cadmium oxide. The electrode was tested in the standard half-cell arrangement with 4 M KOH and 0.4 M LiOH as electrolyte. The current density in the initial cycles was 12 $mA/cm^2$. The first and subsequent discharges took place at a potential of about $-940$ mV (Hg/HgO). In the fourth cycle, the electrode yielded a capacity of 2.96 Ah at 400 $mA/cm^2$ and a final discharge potential of $-500$ mV (Hg/HgO). This corresponds to a cadmium utilization of 35.5% of theory.

EXAMPLE 3

A cadmium electrode having a thickness of 2.3 mm and an active area of 7 cm ×7 cm contained 19.17 g of cadmium oxide, which corresponds to a theoretical capacity of 7.99 Ah. Luviflex D 455 I was introduced into the electrode by impregnation with an aqueous isopropanolic solution. Its content was 0.47% by weight, based on cadmium oxide. A cadmium half-cell containing 6 M KOH+0.4 M LiOH as electrolyte was assembled in the standard way. The first and subsequent discharges took place in the potential range between $-940$ mV and $-950$ mV (Hg/HgO) at a current density of 12 $mA/cm^2$. In the third cycle, the electrode yielded a capacity utilization of 41.4%, at 400 $mA/cm^2$ and a switch-off potential of $-500$ mV (Hg/HgO).

EXAMPLE 4

A cadmium electrode having a size of 49 $cm^2$ and a thickness of 2.4 mm contained 20.19 g of cadmium oxide, which corresponds to a theoretical capacity of 8.42 Ah. The additives contained in the electrode were 0.47% by weight of Luviskol VA 73 E and 2% by weight (=2.7 mol-%) of Ni(OH)$_2$ powder, both based on the cadmium oxide. The electrode was first operated at a low current density in the half-cell arrangement containing 4 M KOH +0.4 M LiOH as electrolyte described above. NO disturbances in the potential variation were observed. In the fourth cycle, the electrode yielded a capacity of 3.60 Ah, which corresponds to a cadmium utilization of 42.8% of theory, at 400 mA/cm$^2$ and a final discharge potential of −500 mV (Hg/HgO). On repeating the high-current test after 100 cycles, a cadmium utilization of 46.0% was found; after 200 cycles it was 40.0%.

EXAMPLE 5

In a comparison experiment, one cadmium electrode (size 49 cm$^2$, thickness 2.4 mm) in each case was tested in 4 M KOH+0.4 M LiOH in a half-cell arrangement. The electrodes did not contain any expanding additive. A fibrous plate impregnated with an aqueous solution of Gafquat 734 and then dried was placed at the bottom in the half-cell containing the electrode A. The amount of expander in the fibrous plate was 0.6% by weight, based on the amount of CdO in the test electrode. Both half-cells were cycled at ±12 mA/cm$^2$. The utilization at a high current density (400 mA/cm$^2$) was determined periodically. The following table shows the measurement results:

|  | Cd Utilization in % of theory | |
| --- | --- | --- |
| Cycles | Electrode A with expander at the bottom | Electrode B without added expander |
| 4 | 15 | 15 |
| 50 | 23 | 10 |
| 120 | 23 | 8 |

It is evident that the electrode B without an expander exhibits an unusable low utilization which, in addition, rapidly decreases further.

Electrode A initially has, as expected, the same utilization, but the Gafquat 734 expander reaches the electrode material via the electrolyte and brings about a marked increase and stabilization of the utilization.

The advantages of the nickel-cadmium storage battery according to the invention are, in particular, that the addition of copolymers of polyvinyl pyrrolidone to the cadmium electrode material or to the electrolyte results in a malfunction-free operation of the storage battery, accompanied by a simultaneously at least as good degree of utilization of the cadmium compared with a nickel-cadmium storage battery which contains homopolymeric polyvinyl pyrrolidone.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Nickel-cadmium storage battery with improved electrical properties, in which the active material with which the negative electrode is filled or the electrolyte contains copolymers of vinyl pyrrolidone as expander, one or more copolymers of vinyl pyrrolidone having a mean molecular weight of 10,000 g/mol to 100,000 g/mol and a vinyl pyrrolidone content of between 5 and 95 mol-%.

2. Nickel-cadmium storage battery according to claim 1, wherein the added copolymers have a vinyl pyrrolidone content of between 15 and 85 mol-%.

3. Nickel-cadmium storage battery according to claim 1, wherein at least one copolymer of vinyl pyrrolidone is added to the active material or to the electrolyte in an amount of 0.1 to 1.0% by weight, preferably in an amount of 0.3 to 0.5% by weight, based on the active material.

4. Nickel-cadmium storage battery according to claim 2, wherein at least one copolymer of vinyl pyrrolidone is added to the active material or to the electrolyte in an amount of 0.1 to 1.0% by weight, preferably in an amount of 0.3 to 0.5% by weight, based on the active material.

5. Nickel-cadmium storage battery according to claim 1, wherein a copolymer consisting of vinyl pyrrolidone and vinyl acetate is added.

6. Nickel-cadmium storage battery according to claim 2, wherein a copolymer consisting of vinyl pyrrolidone and vinyl acetate is added.

7. Nickel-cadmium storage battery according to claim 3, wherein a copolymer consisting of vinyl pyrrolidone and vinyl acetate is added.

8. Nickel-cadmium storage battery according to claim 1, wherein a copolymer consisting of vinyl pyrrolidone, vinyl acetate and alkyl amino-acrylate is added.

9. Nickel-cadmium storage battery according to claim 2, wherein a copolymer consisting of vinyl pyrrolidone, vinyl acetate and alkyl amino-acrylate is added.

10. Nickel-cadmium storage battery according to claim 3, wherein a copolymer consisting of vinyl pyrrolidone, vinyl acetate and alkyl amino-acrylate is added.

11. Nickel-cadmium storage battery according to claim 1, wherein, in addition to the copolymer, oxides and/or hydroxides of nickel, magnesium or titanium are added to the active material or to the electrolyte in an amount of 0.5 to 4 mol-%, based on the active material.

12. Nickel-cadmium storage battery according to claim 2, wherein, in addition to the copolymer, oxides and/or hydroxides of nickel, magnesium or titanium are added to the active material or to the electrolyte in an amount of 0.5 to 4 mol-%, based on the active material.

13. Nickel-cadmium storage battery according to claim 3, wherein, in addition to the copolymer, oxides and/or hydroxides of nickel, magnesium or titanium are added to the active material or to the electrolyte in an amount of 0.5 to 4 mol-%, based on the active material.

14. Nickel-cadmium storage battery according to claim 5, wherein, in addition to the copolymer, oxides and/or hydroxides of nickel, magnesium or titanium are added to the active material or to the electrolyte in an amount of 0.5 to 4 mol-%, based on the active material.

15. Nickel-cadmium storage battery according to claim 8, wherein, in addition to the copolymer, oxides and/or hydroxides of nickel, magnesium or titanium are added to the active material or to the electrolyte in an amount of 0.5 to 4 mol-%, based on the active material.

* * * * *